(12) United States Patent
Pang et al.

(10) Patent No.: US 11,438,856 B2
(45) Date of Patent: Sep. 6, 2022

(54) METHOD AND SYSTEM OF WIRELESS TDMA SCHEDULING FOR INDUSTRIAL MACHINE-TO-MACHINE COMMUNICATION, INCLUDING PROPAGATION-DELAY-AWARE SCHEDULING

(71) Applicant: Hitachi Energy Switzerland AG, Baden (CH)

(72) Inventors: Zhibo Pang, Vasteras (SE); Michele Luvisotto, Vasteras (SE); Xiaolin Jiang, Vasteras (SE); Roger Jansson, Vasteras (SE); Carlo Fischione, Stockholm (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/599,932

(22) PCT Filed: Feb. 21, 2020

(86) PCT No.: PCT/EP2020/054680
§ 371 (c)(1),
(2) Date: Sep. 29, 2021

(87) PCT Pub. No.: WO2020/200582
PCT Pub. Date: Oct. 8, 2020

(65) Prior Publication Data
US 2022/0095255 A1 Mar. 24, 2022

(30) Foreign Application Priority Data
Apr. 1, 2019 (EP) .................................. 19166510

(51) Int. Cl.
*H04W 56/00* (2009.01)
*H04L 27/26* (2006.01)
(Continued)

(52) U.S. Cl.
CPC ....... *H04W 56/003* (2013.01); *H04L 27/2678* (2013.01); *H04W 56/0045* (2013.01);
(Continued)

(58) Field of Classification Search
CPC ........... H04W 72/044; H04W 72/0446; H04W 72/0453; H04L 1/1854
See application file for complete search history.

(56) References Cited

U.S. PATENT DOCUMENTS 6,016,313 A   1/2000 Foster, Jr. et al.
7,596,113 B1  9/2009 Kingston et al.
(Continued)

FOREIGN PATENT DOCUMENTS

CN   105580291 A   5/2016
CN   107925973 A   4/2018
(Continued)

OTHER PUBLICATIONS

International Search Report and Written Opinion for corresponding PCT Application No. PCT/EP2020/054680 dated Apr. 30, 2020, 15 pages.
Chen et al., "LDMAC: A propagation delay-aware MAC scheme for long-distance UAV networks", vol. 144, Oct. 24, 2018, pp. 40-52, XP002793987, 13 pages.

*Primary Examiner* — Raj Jain
(74) *Attorney, Agent, or Firm* — Procopio Cory Hargreaves and Savitch LLP (57) ABSTRACT

Method and system of wireless TDMA scheduling for industrial machine-to-machine communication, including propagation-delay-aware scheduling. A method of scheduling in a TDMA based communication system between a first node and a plurality of second nodes by means of a respective communication link. The method may comprise obtaining a propagation time for each communication link; and determining the largest difference in propagation times of two communication links. The method may further include
(Continued)

selecting a first mode of scheduling if the largest difference is smaller than a threshold, and selecting a second mode of scheduling if the largest difference is larger than the threshold. The first mode includes selecting a guard time to be applied in each of the time slots, which guard time is based on the largest difference. The second mode is propagation-delay-aware and includes scheduling the transmission from each second node on the basis of the respective propagation time.

16 Claims, 4 Drawing Sheets

(51) Int. Cl.
    *H04W 72/04*          (2009.01)
    *H04W 72/12*          (2009.01)
    *H04B 7/26*           (2006.01)

(52) U.S. Cl.
    CPC ..... *H04W 72/044* (2013.01); *H04W 72/0446* (2013.01); *H04W 72/1226* (2013.01); *H04W 72/1263* (2013.01); *H04B 7/2643* (2013.01)

(56) References Cited

U.S. PATENT DOCUMENTS

| | | | |
|---|---|---|---|
| 8,086,249 | B1 | 12/2011 | Dinan et al. |
| 8,155,093 | B2 | 4/2012 | Adams et al. |
| 9,131,509 | B2 | 9/2015 | Malkawi et al. |
| 10,469,215 | B2 * | 11/2019 | Rakib .................. H04L 5/0007 |
| 10,594,653 | B2 * | 3/2020 | Bhushan ........... H04W 72/0493 |
| 2003/0026215 | A1 | 2/2003 | Schafer |
| 2014/0016620 | A1 | 1/2014 | Singh et al. |
| 2015/0085834 | A1 | 3/2015 | Liu et al. |
| 2016/0212720 | A1 | 7/2016 | Nelson, Jr. et al. |
| 2018/0176875 | A1 | 6/2018 | Tiirola et al. |
| 2018/0213549 | A1 * | 7/2018 | Kim .................. H04W 72/1268 |
| 2018/0287764 | A1 * | 10/2018 | Hosseini ............. H04W 72/044 |
| 2018/0343546 | A1 * | 11/2018 | Kolluri ................ H04W 76/27 |

FOREIGN PATENT DOCUMENTS

| | | |
|---|---|---|
| JP | 2012-520016 A | 8/2012 |
| WO | 2016/178477 A1 | 11/2016 |

* cited by examiner

METHOD AND SYSTEM OF WIRELESS TDMA SCHEDULING FOR INDUSTRIAL MACHINE-TO-MACHINE COMMUNICATION, INCLUDING PROPAGATION-DELAY-AWARE SCHEDULING

CROSS-REFERENCE TO RELATED APPLICATIONS

The present application is a national stage entry of International Patent App. No. PCT/EP2020/054680, filed on Feb. 21, 2020, which claims priority to European Patent App. No. 19166510.8, filed on Apr. 1, 2019, which are both hereby incorporated herein by reference as if set forth in full.

BACKGROUND

Field of the Invention

The present disclosure relates to industrial communication, such as communication methods and systems for industrial monitoring and control purposes (e.g. monitoring and controlling an electric power system, monitoring and controlling equipment in an industrial manufacturing facility, and/or for performing other industrial automation control and monitoring tasks), including scheduling of TDMA communication, and is relevant for wireless and wired communication.

Related Art

In industrial communication, a number of slave nodes, such as sensor and/or actuator nodes are connected to a central network controller or gateway, such as a master node. In many industrial applications, e.g. electric power substation automation, the slave nodes are arranged at different distances to the master node. A known method to avoid collisions is to use a wired communication system, and using the same length on an optical fiber for each communication link between slave node and master node, so that the transmission time for each slave node to the master node will be the same. Such a solution is effective in avoiding collisions, however lacks cost-efficiency. Using wireless communication is an alternative, which can provide comparably lower costs, however avoiding collisions cannot be provided by equalizing the communication distances.

One way to avoid collisions in wireless TDMA systems, is to utilize a guard time between packets from different nodes. The nodes can be scheduled to transmit in a slot and a guard time in each slot ensures that the transmission do not interfere with the transmission in the following slot. Such scheduling is comparably simple, however, using guard times may negatively affect the communication latency between the nodes. If the guard time is short compared to the slot, the negative effect of the guard time with respect to an overall latency will be small. If the guard time is comparable in size; e.g. 20% or larger of the duration of the transmission slot, the guard time will have a larger negative impact. In many instances the guard time used can be comparably small. In e.g. Wi-Fi™ communication systems that relate to short range transmissions of large packets the guard time will be comparably small, and for example a guard time for avoiding collisions can be less than 1% of the transmission time, such as having 100 μs (micro-seconds) long packets and using a guard time of 1 μs. For other applications, the use of guard times will have a larger negative impact.

The article "LDMAC: A propagation delay-aware MAC scheme for long-distance UAV networks", by Chen et al. (E1) describes handling the problem of propagation delay in time-critical wireless communication. E1 specifically relates to wireless communication between a base station and a plurality of drones, or unmanned aerial vehicles (UAVs). The distances between the UAVs and the base station varies and thereby the propagation delay. In order to avoid communication collisions, E1 suggests using a "propagation delay-aware access scheme", see abstract of E1. In short, see ch. 4.1 of E1, the drone (UAV) comprises a GPS unit and uses the GPS to determine its distance from the base station and the propagation delay. The drone then selects arrival time slot for the communication and calculates the corresponding transmission time.

The method of E1 is mainly intended for large distances, such as kilometers, and this "propagation delay-aware scheme" may be more complicated than using guard times in more narrow range communication.

Shorter range communication (than in E1) may suffer from similar collision problems. In industrial applications, e.g. manufacturing automation, or electric power substation automation, there is a need for transmitting comparably short packets, comparably often. Communication of packets that collects information from sensors and communicates control data or settings to actuators or control units, may be provided in packets comprising in the order of 100 bits wherein the transmission time, and thereby the slot duration, can be in the order of 1 μs. Radio waves travel about 300 m in one μs, and a guard time for avoiding collisions between nodes separated by 30 meters may therefore be in the order of one tenth of such a 1 μs long time slot duration.

In wired communication, different lengths of optical fiber can be used to equal out the transmission times. Wireless transmissions can be more economic in installation, and setting a guard time can be an effective way to avoid collisions, however, a guard time may introduce problems by negatively affecting the overall cycle time of the communication. A guard time extending about 30% of each time slot will result in an increased delay of the communication cycle by 30%.

In industrial applications having high demands for low latency, the guard time should be short; however, shortening the guard time increases the risks for collisions. Using delay-aware scheduling, as in the system of E1, can avoid collisions and keep the latency low, however, using a guard time to avoid collisions can contribute to a less complicated scheduling.

SUMMARY OF INVENTION

An aim of the present disclosure is to provide a method for wireless communication suitable for industrial applications, such as industrial automation, which wireless communication can contribute further to low latency and high reliability, or at least provide an alternative to the wireless communication methods of the prior art.

For this purpose, a first aspect provides a method of scheduling in a TDMA based communication system, in which communication system a first node, or access node, communicates with a plurality of second nodes, or slave nodes using a respective communication link. The method includes scheduling the communication in time slots. Especially, the method of scheduling comprises:

obtaining a propagation time for each communication link;

determining the largest difference in propagation times between two communication links;

comparing the largest difference to a threshold; and using a first mode of scheduling when the largest difference is smaller than the threshold;

using a second mode of scheduling when the largest difference is larger than the threshold.

The first mode of scheduling includes:

selecting a guard time to be applied in each of the time slots, which guard time (GT) is based on the largest difference, and scheduling each second node for transmitting within a respective time slot of said time slots.

The second mode of scheduling includes:

scheduling the transmission from each second node to arrive at the first node within a respective time slot of said time slots, wherein the scheduling of the transmission of each second node is based on the respective propagation time of the communication link of the second node in question. Preferably, the scheduling of the second mode includes scheduling each second node with a timing advance equal to the propagation time of the second node.

The guard time of the first mode should be large enough to accommodate the largest difference, whereas in the second mode the propagation times, or delays, are handled by scheduling the transmissions from the second nodes.

The first mode of scheduling regulates the guard time to avoid communication collisions.

The selection of operating mode is based on the largest difference in propagation times. In the first mode, the selection of guard time for the time slots is based on the largest difference in propagation times, wherein the scheduling is based on the largest difference. In the second mode, the scheduling is based on the respective propagation time, or propagation delay, of the communication link, wherein the scheduling of the transmissions from each (second) node is based on the propagation time between the node in question and the first node. Thus, the second mode of scheduling is propagation-delay-aware; using propagation-delay-awareness to avoid communication collisions.

In an embodiment of the first aspect, the first mode further includes scheduling transmissions from the first node to the second nodes, and switching from transmissions from the second nodes to transmissions from the first node, wherein the method further includes scheduling one, or more, empty time slots when switching from the transmissions from the second nodes to the transmissions from the first node.

In an embodiment of the first aspect, the second mode includes scheduling transmissions from the first node to the second nodes, and switching from transmissions from the first node to transmissions from the second nodes, wherein the method further includes scheduling one, or more, empty time slots when switching from the transmissions from the first node to the transmissions from second nodes.

In an embodiment of the first aspect, the second mode of scheduling includes scheduling the transmissions from each second node with a timing advance equal to the propagation time.

A second aspect provides a network for scheduling TDMA based communications in time slots. The network controller is configured to perform the method of scheduling according to any embodiment of the first aspect. The network controller comprises:

communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the schedule.

DESCRIPTION OF EMBODIMENTS

Figure 1:
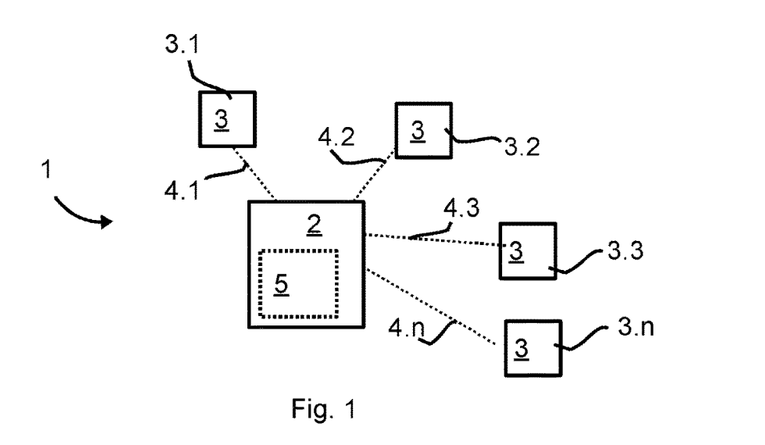
FIG. 1 illustrates a wireless communication network comprising an access node and a plurality of slave nodes.

FIG. 1 illustrates a wireless communication network 1 having a star configuration where a first node, or access node 2, communicates with a number of slave nodes, second nodes, or control nodes 3. The access node 2 is typically communicatively connected to an overall control system, in order also to provide access between the overall control system and the slave nodes 3, however such overall control system is not illustrated in FIG. 1. Each control node 3 is typically connected to, or comprising, an actuator or a sensor of an underlying industrial automation process, however such industrial process is not illustrated in FIG. 1. A network controller 5, is configured for scheduling the communication between the control nodes 3 and the access node 2. In the embodiment of FIG. 1, the network controller 5 is comprised in the access node 2, however, the network controller 5 can alternatively be a separate unit. To distinguish between the slave nodes 3, these are numbered 3.1, 3.2, 3.3, . . . , 3.n, and the illustrated embodiment illustrates a plurality of n slave nodes 3.1-3.n. A respective communication link 4.1-4.n between the access node 2 and each slave node 3.1-3-n is illustrated by dotted lines. Any one of these slave nodes 3.1-3.n will in the following also be referred to as slave node "3.k".

Figure 2:
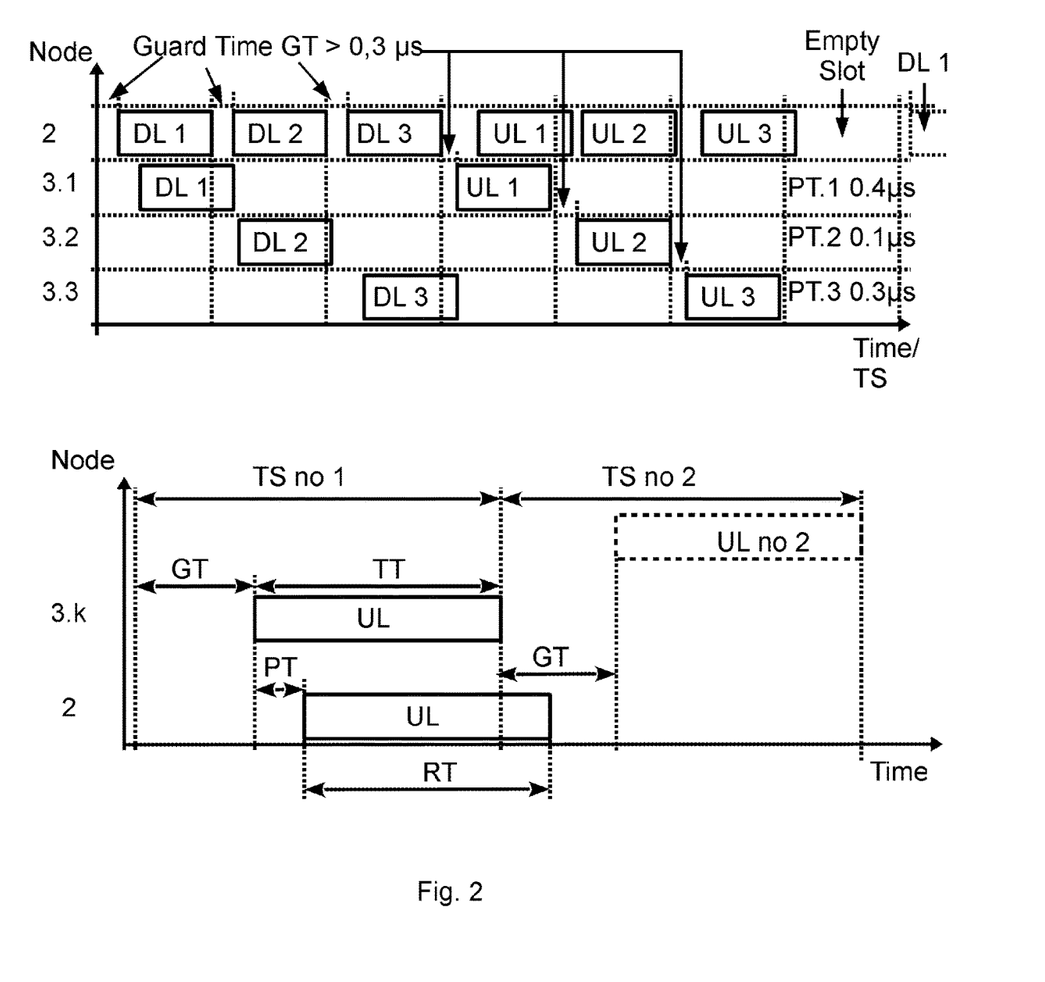
FIG. 2 illustrates TDMA scheduling according to an embodiment.
Figure 3:
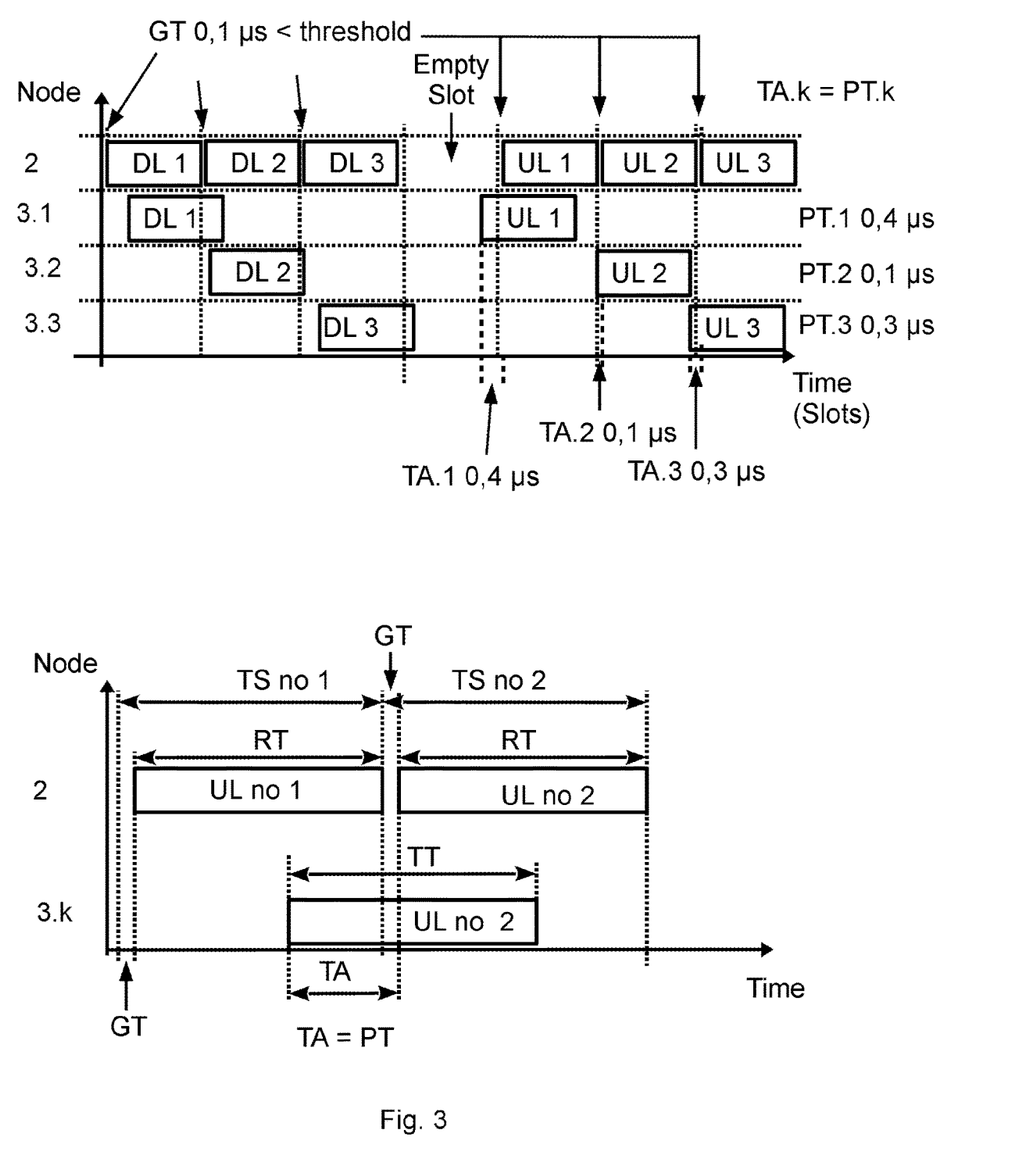
FIG. 3 illustrates TDMA scheduling according to an embodiment.

FIGS. 2 and 3 illustrates scheduling of TDMA communication between the access node 2, and a plurality of slave nodes 3.1-3.n, exemplified by the three slave nodes 3.1-3.3.

Lower part of FIG. 2 illustrate some concepts used herein. Here, a time slot TS is used for scheduling the data communication. The time slot TS (no 1), used for transmissions from a second node 3.k, starts with a guard time GT followed by the transmission of data, e.g. an uplink UL transmission during a transmission time TT. The duration of the time slot TS is equal to the transmission time TT plus the guard time GT. The uplink data will travel to the first node 2, and the time of this travel is referred to as propagation time PT. The uplink data is received in the next time slot TS (no 2) and this reception extends an amount equal to the propagation time PT into the next time slot TS (no 2). The guard time GT can be larger than the propagation time PT, in which case the reception ends before the next uplink data (UL no 2 within broken lines) is transmitted (from a further not illustrated second node). The reception of the uplink data is received during a time interval that can be called reception time RT, equal to the transmission time TT.

In accordance with an embodiment, the communication can be scheduled so that a transmission is received and/or transmitted within a time slot. The communication can be scheduled so that reception and/or transmission extends from one time slot to another. A time slot TS will normally start with a guard time GT as in the lower part of FIG. 2, but it is possible to let the time slots alternatively end with a guard time GT.

FIG. 2 illustrates further, in the upper part of the figure, scheduling according to a first mode of an embodiment. In this first mode, a guard time GT is set for each time slot in order to avoid collisions. The downlink communications of the first mode, exemplified as DL1, DL2, and DL3, are preferably scheduled in consecutive time slots. Also, the uplink communications, exemplified UL1, UL2, UL3, are preferably scheduled in consecutive time slots. Each transmission of both downlink and uplink are scheduled to start at the end of the guard time, i.e. each time slot starts with a guard time, and the transmissions are scheduled to start when the guard time ends so that the transmission will be carried out in the remaining part of the time slot. As can be seen, each transmission is partly received in the following time slot. The guard time GT is in this example set to 0.3 µs. The propagation times PT.1, PT.2, PT.3 between each respective second (slave) node 3.1, 3.2, 3.3 to the first (access) node 2 are 0.4 µs, 0.1 µs, and 0.3 µs, respectively. It should be noted that in this first mode, one or more propagation times PT.k can be larger than the guard time GT. The guard time should be set to be slightly larger than the difference between the largest and smallest propagation time. It should also be noted that the transmissions with largest propagation times, between node 3.1 and node 2 in FIG. 2, will be received after the guard time ends. Using a guard time GT smaller than the largest propagation time PT contributes to a low latency. With such a selection of guard time, the uplink transmissions will be separated and the downlink transmissions will be separated, so that collisions are avoided in both uplink and downlink. However, when switching from uplink to downlink communication, or from downlink to uplink communication, and empty slot could be scheduled, for example in case the last transmission before the switch has a propagation time larger than the guard time. In the illustrated example the empty slot is scheduled after "UL3" even though the propagation time of UL3 (PT.3=0.3 µs) is equal to, or smaller than, the exemplified guard time GT>0.3 µs. An empty time slot between uplink and downlink adds latency, however for the total communication cycle this addition will often be small, especially when the number of nodes is large. Even if an empty time slot may not always be needed between uplink and downlink, the scheduling is facilitated when including such an empty time slot. More than one empty time slot can be used. The number of empty time slots can be based on the propagation times PT.1-PT.n, such as the largest propagation time. The scheduling may be adapted to schedule one of the second nodes 3.1-3.n that has the shortest, or comparably short, propagation time last in the schedule, i.e. to transmit the last one of the uplinks before switching to downlink. Scheduling the second node 3.k that has such a short propagation time lessens the need for empty slots.

To give an example, if a group of slave nodes 3.1-3.n are located (relatively close to each other and) about 100 m from the access node 2, the propagation times PT.1-PT.n may vary between 0.3 µs and 0.4 µs. The guard time can be set to the maximum difference, i.e. 0.1 µs. By setting the guard time to accommodate the maximum difference and being slightly larger than the maximum difference (about 0.1 µs in this case), instead of larger than the maximum propagation time, in this case 0.4 µs, the latency can be kept low even if an empty slot is added when switching between downlink and uplink, or vice versa. If the number of nodes are large, the reduction of total cycle time will be large. The time slot duration of this example will be about 0.3 µs lower when selecting guard time in view of largest difference between propagation times instead of in view of largest propagation time, and for 50 such time slots the total cycle time can be 15 µs lower. In a system where each transmission time, or reception time, is about 1 µs, a 15 µs difference will be quite large.

When the largest difference MAX Δ between the propagation times PT.1-PT.n of the slave nodes 3.1-3.n and the access node 2 is larger, the guard time will of course be larger in this first mode.

The second mode is selected according an embodiment when the largest difference MAX Δ is determined to be too large; i.e. larger than a set threshold. The threshold should be set in accordance with requirements of the underlying industrial process, especially requirements regarding frequency of measurement samples from sensor nodes, or requirements for control of actuators in response to monitored signals for example. The second mode adds complexity to the scheduling, but lowers overall latency, and in view of the underlying industrial process, the threshold should be selected. The number of nodes of the communication system will also affect the overall cycle time, and in system with comparably few nodes comparably larger guard times can be tolerated. The threshold may suitably be set as a proportion of the duration of the time slot. By setting the threshold as a proportion of the time slot, the threshold will adapt to variations of the time slot length that may be induced by other changes in the communication system, for example the cycle time of the underlying industrial automation process. Typical values of a threshold would be 10% to 30% of the time slot. However, as stated, the threshold will depend on the underlying industrial automation process, and for communication systems with very few communication nodes; less than ten, or many communication nodes, more than 200, threshold values larger than 30% or less than 10% may very well be appropriate.

In the second mode, the communication is scheduled in view of the propagation times PT.1-PT.n, i.e. for each slave node 3.k in view of its respective propagation time PT.k. FIG. 3 illustrates scheduling according to the second mode.

In the examples given herein, an uplink UL or downlink DL communication that is scheduled for transmission in a time slot TS will be scheduled for transmission start when the guard time GT ends, and until the time slot TS ends, as the transmission time TT does in the lower part of FIG. 2.

Also, in the examples, when an UL or DL communication is scheduled for reception in a time slot TS it will be scheduled for reception with start when the guard time GT ends until the time slot TS ends. In the second mode of delay-aware scheduling, each of the UL communications is scheduled for reception at the access node 2 within a time slot, i.e. a respective time slot. In such a scheduling for reception within a time slot, the communication will be scheduled to start a time period equal to the propagation time PT before the start of the guard time GT, e.g. as the uplink communications UL1, UL2, UL3 illustrated in upper part of FIG. 3. Lower part of FIG. 3 illustrates the concept of timing advance that can be used in the delay-aware scheduling of the second mode.

The second uplink "UL no 2" is transmitted from a slave node 3.$k$ a certain time before the second time slot (TS no 2) in order to be received at the access node 2 in the second time slot (TS no 2) after the guard time. In this example, the transmission point in time occurs a certain time in advance of the end of the guard time GT of the second time slot (TS no 2), which certain time in advance is equal to the propagation time PT of the communication link 4.$k$. This time in advance can be referred to as "timing advance" TA.

In the case of delay-aware scheduling of the UL communications, an UL communication may be scheduled for transmission within the guard time GT of the time slot TS, or before the guard time GT of the time slot TS, i.e. during the previous time slot TS. In the embodiment of the second mode illustrated in the upper part of FIG. 3, each second node 3.$k$ is scheduled to start transmitting a certain time in advance, a "timing advance" TA.k, of the end of the guard time of the receiving time slot, which time in advance equals the propagation time PT.k of the UL communication of the second node 3.$k$ in question.

As illustrated in FIG. 3, the communication is scheduled so that the access node 2 will receive uplink data communication and transmit downlink data communication within the time slots. Each node 3.$k$ of the second nodes 3.1-3.$n$ will receive the downlink data in accordance with its respective propagation time PT.k. Thus, scheduling of the downlink data communication includes scheduling the access node 2 to transmit in respective time slots, preferably consecutive, for the second nodes 3.1-3.$n$. Preferably, one time slot for each second node 3.$k$. Also, the scheduling of the uplink data communication includes scheduling each second node 3.$k$ to transmit with a timing advance TA.k equal to its propagation time PT.k so that the UL data arrives at the first node 2, i.e. the access node 2, in a time slot dedicated for reception of data communication from that second node 3.$k$. Thus, the second nodes 3.1, 3.2, 3.3 are scheduled to transmit the uplink data with a respective timing advance TA.1, TA.2, TA.3, wherein each timing advance is equal to the corresponding propagation time PT.1, PT.2, PT.3 of the communication link 4.$k$ in question.

The propagation-delay-aware scheduling of the embodiment in the upper part of FIG. 3 includes using an empty slot when switching from DL transmissions to UL transmissions. The use of such an empty slot is a preferred way to prevent communication collisions due to a slave node 3.$k$ beginning its UL transmissions before another slave node 3.$k$ has received its DL transmission. Thus, in the second mode, the second nodes 3.1-3.$n$ should preferably not be allowed to transmit before the last of the second nodes has received its DL. More than one empty slot may be used in view of the propagation time (e.g. PT.3) of the last DL communication (illustrated by DL3 in the upper part of FIG. 3) and the timing advance (e.g. TA.1) of the first uplink transmission (illustrated as UL1 in the upper part of FIG. 3).

The guard time, in this second mode, can be comparably low and should preferably be set on the basis of the respective clocks of the second nodes, i.e.

to accommodate synchronization differences of each clock of a respective second node 3.$k$ and the access node 2. The guard time should be set in accordance with the synchronization accuracy of the nodes in the network. The synchronization process as such is not a feature of the invention and is not described further herein. In the example of FIG. 3, the guard time is set to 0.1 μs, which is less than the 0.3 μs guard time of FIG. 2 and less than the threshold. Thus, the guard time of the second operation mode is not based on the propagation times PT.1-PT.n nor on the largest difference (MAX Δ); but is instead preferably based on the respective differences in synchronization between the clocks of slave nodes 3.1-3.$n$ and the access node 2 clock.

Figure 4:
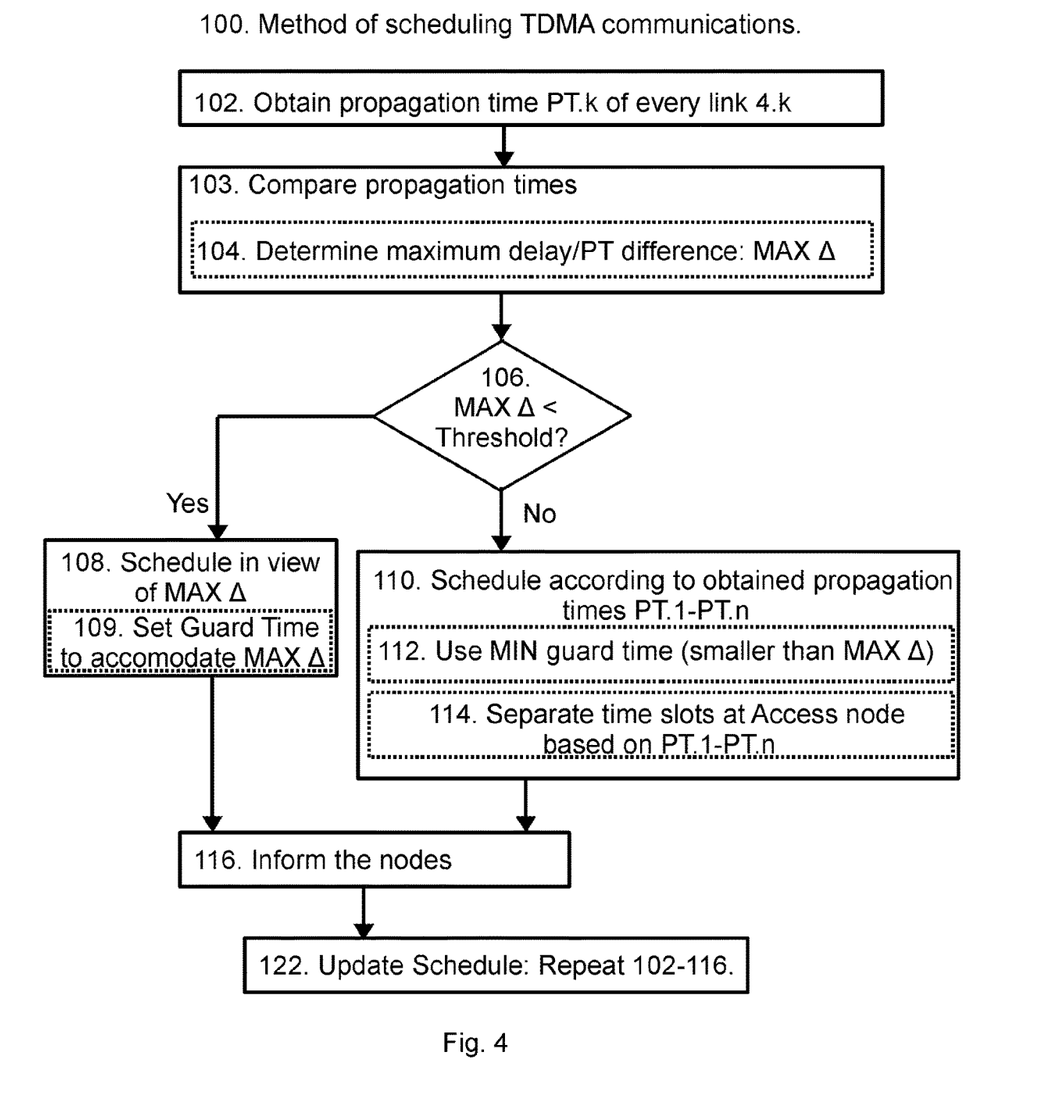
FIG. 4 illustrates a method for scheduling according to an embodiment.

FIG. 4 illustrates a method 100 of scheduling TDMA communications, which is applicable to wired and to wireless communication. The method starts with obtaining 102 a propagation time, or delay, for each link 4.1-4.$n$ in the communication system, such as every one of the links between the access node 2 and the slave nodes 3.1-3.$n$ in the example of FIG. 1. Obtaining 102 propagation times can be performed in any known manner. For example, each node 3.$k$, or some of the nodes 3, may be configured with GPS units, or other position determining equipment, and report their position to the network controller 5 which network controller 5 determines the transmission times from the position indications;

the distance between each node 3.$k$, or by some of the nodes 3, and the access node 2 can be estimated by looking at information contained in the messages between the nodes, for example using angle-of-arrival (AoA), time-of-arrival (ToA), time-difference-of-arrival (TDoA); the distance can be reported to the network controller 5 and used to determine the propagation times; or the position of each node 3.$k$, or some of the nodes 3, including the access node 2, may be determined during installation of the communication nodes 3, especially for nodes that remain stationary after installation, after which the positions are transferred to the network controller 5 and used to determine propagation times, or the positions are used to determine the propagation times which subsequently are reported to the network controller 5. The obtaining 102 of propagation times may also be performed by a combination of the exemplified techniques.

The scheduling method 100 continues with comparing 103 said propagation times. The comparing 103 of propagation times includes determining 104 differences between the propagation times of the communication links 4.1-4.$n$. Especially, the comparing 103 includes determining 104 the largest difference (MAX Δ) between the propagation times of the communication links 4.1-4.$n$ from any of the nodes 3.1-3.$n$ to the access node 2. Also, the scheduling method 100 includes determining 106 if the largest difference (MAX Δ) between two propagation times is smaller, or larger, than a predetermined threshold. The threshold can preferably be set in view of an underlying industrial process that is controlled and/or monitored by means of the communication. In view of such an industrial process a maximum for the total delay, or duration, of the communication cycle can be used to determine a threshold that induces the maximum, or a shorter, total delay in the communication. It can be noted that the scheduling of the communication in different, but similar, industrial processes, which tolerate similar total delays, might use different thresholds in view of the number of nodes, since the number of nodes affects the total length of the communication cycle.

Based upon the comparison to the threshold, the method 100 applies different scheduling modes. If the largest difference, MAX Δ, is smaller than the threshold, the communication is scheduled 108 (in a first mode) in accordance with the largest difference in transmission times, especially employing a guard time for avoiding collisions due to the differences in transmission times. The scheduling 108 that employs a guard time preferably includes setting 109 a guard time between successive transmissions to be large enough to accommodate the largest difference, MAX Δ. Thus, the guard time should preferably be set to the largest determined difference or slightly larger. The threshold will then define the largest tolerable propagation delay difference.

The guard time may, in this first mode, alternatively be equal to the threshold. Such scheduling will be less complicated by avoiding setting 109 the guard time, however, the delay will often be longer than necessary.

If the largest difference (MAX Δ) is larger than the threshold, the scheduling method selects another (second) control mode (110, 112, 114). The second control mode (110, 112, 114) is a propagation-delay-aware control mode, and includes scheduling 110 transmissions in accordance with the determined propagation times PT.1-PT.n. The guard time between consecutive transmissions is preferably set 112 to a small value, which can be much smaller than the threshold, since the propagation delays will be handled in this scheduling mode. In the illustrated embodiment of this second mode, the transmissions in the uplink are scheduled 114, with timing advance, to arrive at the access node 2 in consecutive time slots, all uplink transmissions scheduled for arrival in different time slots. Preferably, each uplink transmission is scheduled with a timing advance equal to the propagation time for that link, based on the obtained 102 propagation delays.

Once the control mode has been determined and a schedule for both uplink and downlink transmissions has been computed, the network controller 5 will inform 116 the nodes 3.1-3.n about the schedule. This can be done, for example, through a broadcast beacon frame to be transmitted by the access node 2 at the beginning of the communication cycle.

The method can be repeated so that the schedule is updated 122. For example, the method can be repeated regularly such as after a certain number of communication cycles or a certain time. Alternatively, or additionally, the communication interface can be monitored, and, if the propagation times change more than a predetermined amount, the network controller 5 will update 122 the schedule. Thus, updating 122 the schedule may be performed regularly or in view of changes in the radio communication interface. To this aim, the steps 102-116 are repeated and a new schedule is created and distributed to the nodes 3.1-3.n.

Figure 5:
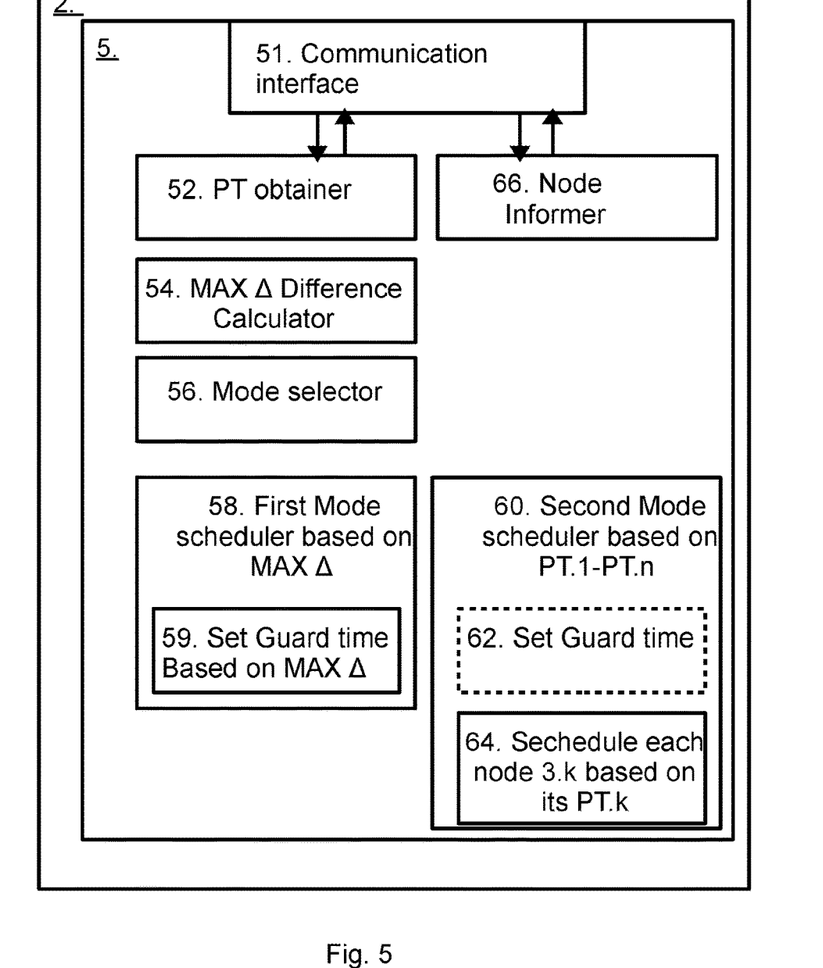
FIG. 5 illustrates an embodiment of a network controller.

FIG. 5 illustrates an example of a network controller 5 configured to perform the method of scheduling according to an embodiment and as exemplified in FIG. 4. The network controller 5 is illustrated as an integral part of the access node 2, but may be an independent unit. The network controller 5 comprises hardware and software illustrated by functional blocks configured to perform the scheduling methods herein described. For this purpose the network controller 5 comprises a communication interface 51 configured for wireless communication with the slave nodes 3.1-3.n and may also include circuitry for wired or wireless communication with a further control system (not illustrated). The network controller is configured to use the communication interface for obtaining propagation times PT.1-PT.n of each communication link 4.1-4.n of the second nodes 3.1-3.n, and for communicating a communication schedule to each second node 3.k. The network controller 5 comprises a propagation time obtainer 52, corresponding to the process of obtaining 102 the propagation times in the scheduling method 100, configured to obtain said propagation times using said communication interface 51. The network controller further comprises a node informer 66 configured to inform each second node 3.1-3.n about the scheduling of the second node 3.k; including informing about a guard time GT of the time slots of the communication system, and a respective timing advance TA.k.

The network controller 5 further comprises a difference calculator 54 configured to determine the largest difference in propagation times PT.1-PT.n between the second nodes 3.1-3.n, which is configured to perform the determining 104 of the maximum propagation delay difference in the method 100 of scheduling.

The network controller 5 further comprises a mode selector 56 configured to select operating mode based on the largest determined difference, MAX Δ. The network controller 5 is configured to perform the determining 106 of whether the largest difference is larger or smaller than the threshold by means of the mode selector and select the first mode if the largest difference MAX Δ is larger, and select the second mode if the largest difference MAX Δ is smaller.

The network controller 5 comprises circuitry (58, 59) for performing the first mode (108, 109) and circuitry (60, 62, 64) for performing the second mode (110, 112, 114).

The network controller 5 comprises a first mode scheduler 58 for scheduling the communication between the access node 2 and the second nodes 3.1-3.n, which first mode scheduler 58 is configured to schedule the communication based on the maximum difference MAX Δ. The first mode scheduler 58 preferably includes a guard time setter 59 that sets the guard times of the time slots based on the maximum difference MAX Δ, especially large enough to accommodate the maximum difference MAX Δ.

The network controller 5 comprises a second mode scheduler 60 for scheduling the communication between the access node 2 and the second nodes 3.1-3.n, which second mode scheduler 60 is configured to schedule the communication based on the propagation times PT.1-PT.n. The communication is scheduled for reception and transmission in the access node 2 in each time slot. Especially, the second mode scheduler 60 comprises a node scheduler 64 configured to schedule each second node 3.k with a timing advance TA.k equal to the propagation time 4.k of the second node 3.k in question. Preferably also, the second mode scheduler 60 comprises a guard time setter 62 configured to set the guard time of the communication time slots, which guard time is set to a value smaller than the threshold used for the mode selection 106 by the mode selector 56.

Figure 6:
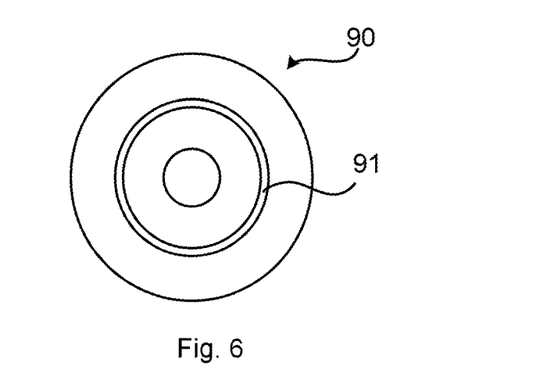
FIG. 6 shows a computer-readable medium.

FIG. 6 shows a computer-readable optical medium 90. The method of FIG. 4 may be implemented as a computer program 91 (software) comprising instructions which, when the program is executed by a programmable computer, cause the computer to carry out any of these methods. In particular, the instructions may be such as to cause a network controller 5 for scheduling TDMA based communications in time slots (TS), which comprises:

communication interface 51 for communicating with communication nodes 2, 3.1-3.n to be scheduled,
a propagation time obtainer (52) for obtaining propagation times of communication links 4.1-4.n,
a difference calculator 54 for determining differences between obtained propagation times,
an operation mode selector 56 for selecting operation mode on the basis of a largest calculated difference between propagation times, a first mode scheduler 58 for scheduling the TDMA based communication in accordance with a first mode of scheduling, a second mode scheduler 60 for scheduling the TDMA based communication in accordance with a second mode of scheduling, and a node informer 66 for informing each scheduled node 2, 3.1-3.$n$ about the scheduling, to carry out the method of FIG. 4. The computer program 91 may be stored or distributed on a computer-readable medium 90 like the one shown in FIG. 6. Further computer-readable media include non-volatile (including permanent and non-permanent storage) and volatile media, such as random access memory, magnetic, optical or solid-state memory, fixed and movable memory drives. Computer-readable media may further be systematized as non-transitory media, including storage media, and transitory media, such as a modulated electromagnetic or optical wave carrying information.

The present invention has been described in embodiments with reference to the figures. In these embodiments, a method is provided of scheduling in a TDMA based communication system 1 between a first node 2 and a plurality of second nodes 3.1-3.$n$ by means of a respective communication link 4.1-4.$n$. A network controller has also been described for performing the method of scheduling in these embodiments.

The method comprises obtaining (102) a propagation time (PT.1-PT.n) for each communication link (4.1-4.$n$); and determining (104) the largest difference (MAX Δ) in propagation times (PT.1-PT.n) of two communication links (4.1-4.$n$). The method further comprises selecting a first mode (108, 109) of scheduling in case the largest difference (MAX Δ) is smaller than a threshold, and selecting a second mode (110, 112, 114) of scheduling case the largest difference (MAX Δ) is larger than the threshold. The first mode (108-109) of includes selecting (109) a guard time (GT) for time slots (TS), which guard time (GT) is based on the largest difference (MAX Δ). The second mode (110, 112, 114) of scheduling is propagation-delay-aware and includes scheduling (110) the transmission from each second node (3.$k$) on the basis of the respective propagation time (PT.k).

The present invention is, however, not limited to these embodiments but may be varied by a person skilled in the art within the scope of the claims.

The invention claimed is:

1. A method of scheduling in a TDMA based communication system, in which communication system a first node communicates with a plurality of second nodes using a respective communication link for each second node, and the method includes scheduling the communication in time slots, said method further comprising:
   obtaining a propagation time for each communication link;
   determining the largest difference in propagation times of two communication links;
   comparing the largest difference to a threshold; and
   in case the largest difference is smaller than the threshold using a first mode of scheduling;
   in case the largest difference is larger than the threshold using a second mode of scheduling,
   wherein said first mode of scheduling includes:
   selecting a guard time to be applied in each of the time slots, which guard time is based on the largest difference, and scheduling each second node for transmitting in a respective time slot of said time slots;

and wherein said second mode of scheduling includes:
   scheduling the transmission from each second node to arrive at the first node at a respective time slot of said time slots, wherein the scheduling of the transmission of each second node is based on the respective propagation time of the communication link of that second node.

2. A method of scheduling according to claim 1, wherein the first mode of scheduling further includes scheduling transmissions from the first node to the second nodes, and switching from transmissions from the second nodes to transmissions from the first node, wherein the method further includes scheduling one, or more, empty time slots when switching from the transmissions from the second nodes to the transmissions from the first node.

3. A non-transitory computer-readable medium storing a computer program comprising instructions which, when the program is executed by a computer, cause the computer to carry out the communication method according to claim 2.

4. A method of scheduling according to claim 2, wherein the second mode of scheduling further includes scheduling transmissions from the first node to the second nodes, and switching from transmissions from the first node to transmissions from the second nodes, wherein the method further includes scheduling one, or more, empty time slots when switching from the transmissions from the first node to the transmissions from second nodes.

5. A method of scheduling according to claim 2, wherein the second mode of scheduling includes scheduling the transmissions from each second node with a timing advance equal to the propagation time.

6. A network controller for scheduling TDMA based communications in time slots, comprising a communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the scheduling, said network controller being configured to perform the method of scheduling according to claim 2.

7. A method of scheduling according to claim 1, wherein the second mode of scheduling further includes scheduling transmissions from the first node to the second nodes, and switching from transmissions from the first node to transmissions from the second nodes, wherein the method further includes scheduling one, or more, empty time slots when switching from the transmissions from the first node to the transmissions from second nodes.

8. A non-transitory computer-readable medium storing a computer program comprising instructions which, when the program is executed by a computer, cause the computer to carry out the communication method according to claim 7.

9. A method of scheduling according to claim 7, wherein the second mode of scheduling includes scheduling the transmissions from each second node with a timing advance equal to the propagation time.

10. A network controller for scheduling TDMA based communications in time slots, comprising a communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the scheduling, said network controller being configured to perform the method of scheduling according to claim 7.

11. A method of scheduling according to claim 1, wherein the second mode of scheduling includes scheduling the transmissions from each second node with a timing advance equal to the propagation time.

12. A non-transitory computer-readable medium storing a computer program comprising instructions which, when the program is executed by a computer, cause the computer to carry out the communication method according to claim 11.

13. A network controller for scheduling TDMA based communications in time slots, comprising a communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the scheduling, said network controller being configured to perform the method of scheduling according to claim 11.

14. A network controller for scheduling TDMA based communications in time slots, comprising a communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the scheduling, said network controller being configured to perform the method of scheduling according to claim 1.

15. A non-transitory computer-readable medium storing a computer program comprising instructions which, when the program is executed by a computer, cause the computer to carry out the communication method according to claim 1.

16. A network controller for scheduling TDMA based communications in time slots, comprising a communication interface for communicating with communication nodes to be scheduled, a propagation time obtainer for obtaining propagation times of communication links, a difference calculator for determining differences between obtained propagation times, an operation mode selector for selecting operation mode on the basis of a largest calculated difference between propagation times, a first mode scheduler for scheduling the TDMA based communication in accordance with a first mode of scheduling, a second mode scheduler for scheduling the TDMA based communication in accordance with a second mode of scheduling, and a node informer for informing each scheduled node about the scheduling, said network controller being configured to perform the method of scheduling according to claim 1.

* * * * *